(12) United States Patent
Ozcan et al.

(10) Patent No.: US 10,387,105 B2
(45) Date of Patent: Aug. 20, 2019

(54) METHOD AND APPARATUS FOR CONTROLLING AN APPLICATION

(71) Applicant: Nokia Technologies Oy, Espoo (FI)

(72) Inventors: Koray Ozcan, Farnborough (GB); Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/960,233

(22) Filed: Dec. 4, 2015

(65) Prior Publication Data

US 2016/0192097 A1 Jun. 30, 2016

(30) Foreign Application Priority Data

Dec. 29, 2014 (GB) .................................. 1423280.5

(51) Int. Cl.
*G06F 3/16* (2006.01)
*G06F 3/03* (2006.01)
*H04R 1/02* (2006.01)

(52) U.S. Cl.
CPC ............... *G06F 3/165* (2013.01); *G06F 3/03* (2013.01); *H04R 1/028* (2013.01); *H04R 2499/11* (2013.01); *H04R 2499/15* (2013.01)

(58) Field of Classification Search
CPC . G06F 3/165; G06F 3/03; G06F 3/017; G06F 3/01; G06F 3/167; H04R 1/028;
(Continued)

(56) References Cited

U.S. PATENT DOCUMENTS 9,516,406 B2 * 12/2016 Fromel .................... H04R 1/00
2009/0088222 A1 4/2009 Numano et al.
(Continued)

FOREIGN PATENT DOCUMENTS

EP 2715719 A2 4/2014
FR 2939219 A1 6/2010
(Continued)

OTHER PUBLICATIONS

"Sprint Printable User Guide", Sprint, Retrieved on Nov. 20, 2015, Webpage available at : http://support.sprint.com/global/pdf/user_guides/samsung/galaxy_note_3/samsung_galaxy_note_3_ug.pdf.
(Continued)

*Primary Examiner* — Jason R Kurr
(74) *Attorney, Agent, or Firm* — Harrington & Smith

(57) ABSTRACT

In an example embodiment, method, apparatus and computer program product are provided. The method includes capturing an acoustic signal by a microphone of an apparatus to generate an electrical output signal. The acoustic signal is rendered in response to a source audio signal by a speaker through at least one speaker interface element of the apparatus. The electrical output signal is compared to the source audio signal in order to determine whether the electrical output signal is being affected by mechanical vibrations caused at least partially by the speaker interface element being at least partially interfered by a user. A predetermined action is further performed in the apparatus whenever it is determined that the electrical output signal is affected by the mechanical vibrations caused at least partially by the speaker interface element being at least partially interfered by the user.

19 Claims, 6 Drawing Sheets

(58) Field of Classification Search
CPC ............ H04R 2499/11; H04R 2499/15; H04R 29/001; H04R 29/004; H04M 1/72519; H04M 1/72541

See application file for complete search history.

(56) References Cited

U.S. PATENT DOCUMENTS

| | | | |
|---|---|---|---|
| 2009/0129622 A1* | 5/2009 | Chen .................... | H04R 19/016 381/369 |
| 2011/0037734 A1 | 2/2011 | Pance et al. | |
| 2012/0112930 A1 | 5/2012 | Ivanov et al. | |
| 2013/0195280 A1* | 8/2013 | Sugiyama ............... | H04M 1/60 381/57 |
| 2013/0259247 A1 | 10/2013 | Kim | |
| 2014/0022189 A1 | 1/2014 | Sheng et al. | |
| 2015/0029112 A1* | 1/2015 | Macours ................ | H03K 17/96 345/173 |
| 2015/0131814 A1* | 5/2015 | Usher .................... | G06F 3/017 381/123 |
| 2016/0127845 A1* | 5/2016 | Cagdaser ............ | H04R 29/004 381/58 |
| 2017/0371616 A1* | 12/2017 | Su .......................... | G06F 3/165 |

FOREIGN PATENT DOCUMENTS

| | | |
|---|---|---|
| JP | 2008-271062 A | 11/2008 |
| KR | 2010-0024552 A | 3/2010 |
| WO | 2008/085769 A1 | 7/2008 |
| WO | 2012/166386 A2 | 12/2012 |
| WO | 2014/025962 A1 | 2/2014 |
| WO | 2014/171568 A2 | 10/2014 |

OTHER PUBLICATIONS

"Mobile gesture design at Nokia—Developing a new dialect of interaction", Windows, Retrieved on Nov. 20, 2015, Webpage available at : http://conversations.nokia.com/2009/06/05/mobile-gesture-design-at-nokia-developing-a-new-dialect-of-interaction/.

"How to Put Cordless Phones on Mute", eHow, Retrieved on Nov. 20, 2015, Webpage available at : http://www.ehow.com/how_7678421_put-cordless-phones-mute.html.

"How to Mute Sounds Using Your Hand on the Samsung Galaxy S4", Wiki How, Retrieved on Nov. 19, 2015, Webpage available at : http://www.wikihow.com/Mute-Sounds-Using-Your-Hand-on-the-Samsung-Galaxy-S4.

Berdnikova et al., "Acoustic Noise Pattern Detection and Identification Method in Doppler System", Elektronika IR Elektrotechnika, vol. 18, No. 8, 2012, pp. 65-68.

Search Report received for corresponding United Kingdom Patent Application No. 1423280.5, dated Jun. 24, 2015, 4 pages.

* cited by examiner

METHOD AND APPARATUS FOR CONTROLLING AN APPLICATION

TECHNICAL FIELD

Various implementations relate generally to method, apparatus, and computer program product for control of applications.

BACKGROUND

Various electronic devices, for example, mobile phones, and other multimedia devices are widely used for applications such as voice/video phone calls, messages, emails, playback of audio/video songs, gaming, alarm, calendar, and the like. Efforts have been made for realizing easier control techniques of the applications in these devices, for example, muting or pausing a song, increasing/decreasing sound level of the playback or muting ringtone of an incoming call. Some examples of controlling the applications include using mechanical buttons or touch sensitive sections on the electronic devices. However, mechanical considerations have to be taken into account for achieving control of the applications. Moreover, the user may require different actions to be performed for associated situations, for example, the user may want to mute the song or to pause the song, permanently or for short durations. Accordingly, the user still wants a greater control technique over different actions related to the applications. However, such techniques for achieving greater control over the actions related to the applications should not add extra hardware to the electronic devices.

SUMMARY OF SOME EMBODIMENTS

Various aspects of example embodiments are set out in the claims.

In a first aspect, there is provided a method comprising: capturing an acoustic signal by a microphone of an apparatus to generate an electrical output signal wherein the acoustic signal is rendered by at least one speaker through at least one speaker interface element of the apparatus in response to a source audio signal; comparing the electrical output signal to the source audio signal in order to determine whether the electrical output signal is being affected by mechanical vibrations caused at least partially by the at least one speaker interface element being at least partially interfered by a user; and performing a predetermined action in the apparatus whenever it is determined that the electrical output signal is affected by the mechanical vibrations caused at least partially by the at least one speaker interface element being at least partially interfered by the user.

In a second aspect, there is provided an apparatus comprising at least one processor; and at least one memory comprising computer program code, the at least one memory and the computer program code configured to, with the at least one processor, cause the apparatus to at least perform: capture an acoustic signal by a microphone of the apparatus to generate an electrical output signal wherein the acoustic signal is rendered by at least one speaker through at least one speaker interface element of the apparatus in response to a source audio signal; compare the electrical output signal to the source audio signal in order to determine whether the electrical output signal is being affected by mechanical vibrations caused at least partially by the at least one speaker interface element being at least partially interfered by a user; and perform a predetermined action in the apparatus whenever it is determined that the electrical output signal is affected by the mechanical vibrations caused at least partially by the at least one speaker interface element being at least partially interfered by the user.

In a third aspect, there is provided a computer program product comprising at least one computer-readable storage medium, the computer-readable storage medium comprising a set of instructions, which, when executed by one or more processors, cause an apparatus to at least perform: capture an acoustic signal by a microphone of the apparatus to generate an electrical output signal wherein the acoustic signal is rendered by at least one speaker through at least one speaker interface element of the apparatus in response to a source audio signal; compare the electrical output signal to the source audio signal in order to determine whether the electrical output signal is being affected by mechanical vibrations caused at least partially by the at least one speaker interface element being at least partially interfered by a user; and perform a predetermined action in the apparatus whenever it is determined that the electrical output signal is affected by the mechanical vibrations caused at least partially by the at least one speaker interface element being at least partially interfered by the user.

In a fourth aspect, there is provided an apparatus comprising: means for capturing an acoustic signal by a microphone of an apparatus to generate an electrical output signal wherein the acoustic signal is rendered by at least one speaker through at least one speaker interface element of the apparatus in response to a source audio signal; means for comparing the electrical output signal to the source audio signal in order to determine whether the electrical output signal is being affected by mechanical vibrations caused at least partially by the at least one speaker interface element being at least partially interfered by a user; and means for performing a predetermined action in the apparatus whenever it is determined that the electrical output signal is affected by the mechanical vibrations caused at least partially by the at least one speaker interface element being at least partially interfered by the user.

In a fifth aspect, there is provided a computer program comprising program instructions which when executed by an apparatus, cause the apparatus to: capture an acoustic signal by a microphone of the apparatus to generate an electrical output signal wherein the acoustic signal is rendered by at least one speaker through at least one speaker interface element of the apparatus in response to a source audio signal; compare the electrical output signal to the source audio signal in order to determine whether the electrical output signal is being affected by mechanical vibrations caused at least partially by the at least one speaker interface element being at least partially interfered by a user; and perform a predetermined action in the apparatus whenever it is determined that the electrical output signal is affected by the mechanical vibrations caused at least partially by the at least one speaker interface element being at least partially interfered by the user.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7 of the drawings.

Figure 1:
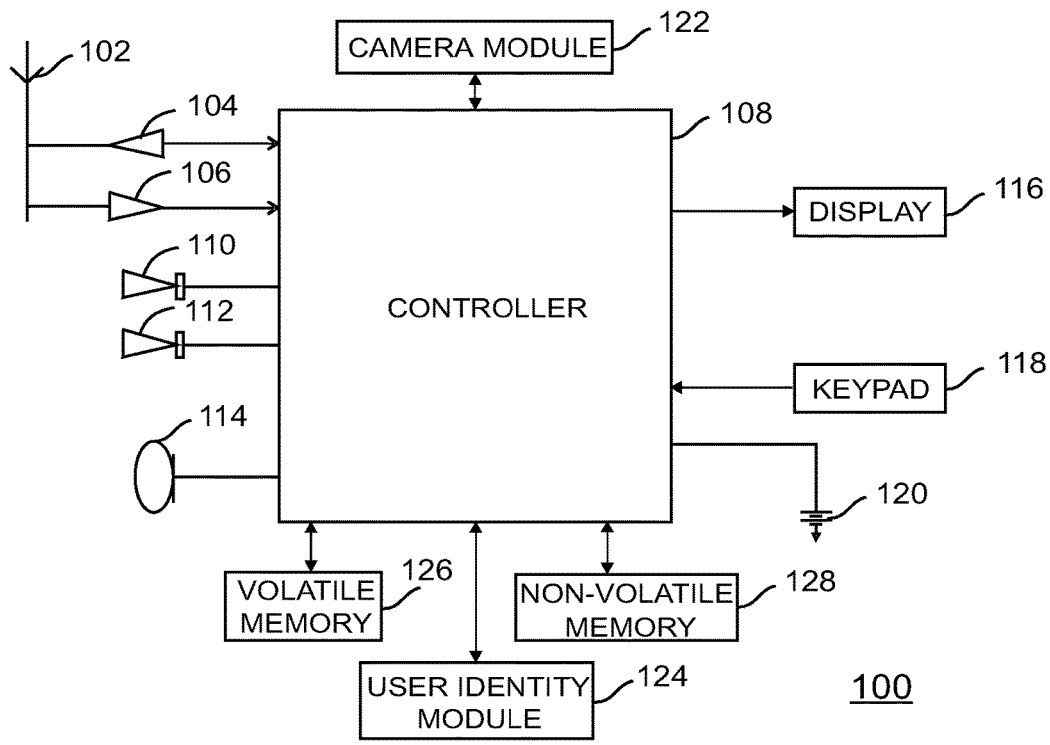
FIG. 1 illustrates a device, in accordance with an example embodiment.

FIG. 1 illustrates a device 100, in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of touch screen based mobile electronic devices, for example, portable digital assistants (PDAs), mobile televisions, gaming devices, cellular phones, all types of computers (for example, laptops, mobile computers or desktops), cameras, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional web browser. The connectivity program may then allow the device 100 to transmit and receive web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
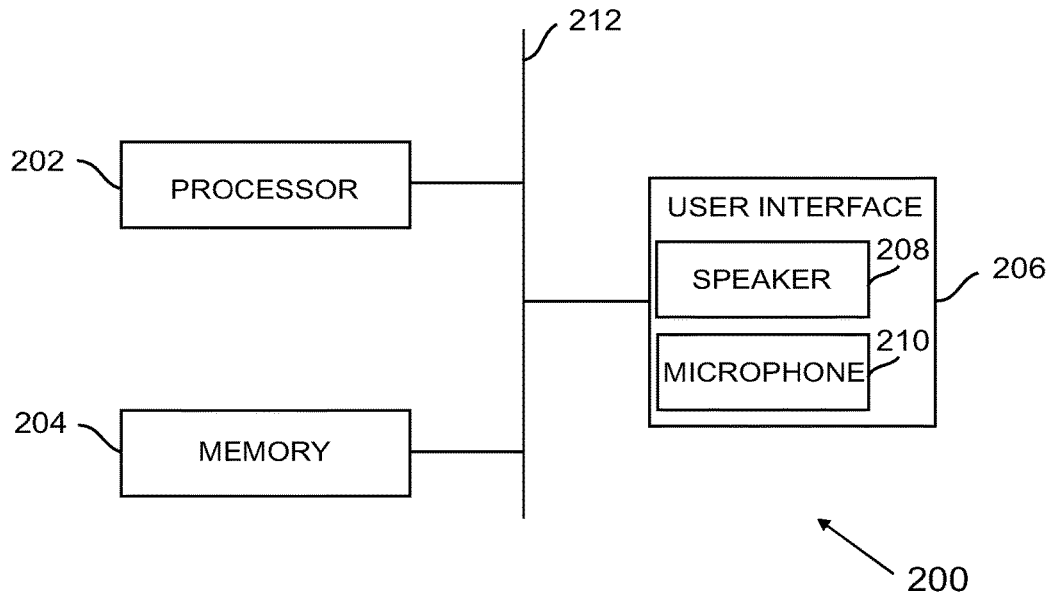
FIG. 2 illustrates an apparatus configured for controlling applications, in accordance with an example embodiment.

FIG. 2 illustrates an apparatus 200 configured for controlling applications being executed in the apparatus 200, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 is the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 is in communication with the processor 202. Examples of the user interface 206 include, but are not limited to, input interface and/or output interface. The input interface is configured to receive an indication of a user input. The output interface provides an audible, visual, mechanical or other output and/or feedback to the user. Examples of the input interface include, but are not limited to, a keyboard, a mouse, a joystick, a keypad, a touch screen, soft keys, a microphone, and the like. Examples of the output interface include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 includes, among other devices or elements, any or all of a speaker 208, a microphone 210, a display, a keyboard, touch screen, or the like. In this regard, for example, the processor 202 may comprise user interface circuitry configured to control at least some functions of one or more elements of the user interface 206, such as, for example, the speaker 208, the microphone 210, ringer, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In some example embodiments, the speaker 208 is an electric-to-acoustic speaker, for example, an electrodynamic speaker, a flat panel speaker, a diaphragm speaker, and the like, that is made-up of electronic and electrical components, magnetic components and/or other materials. In such example embodiments, the speaker 208 includes an electric-to-acoustic transducer which converts a source audio signal into an acoustic signal. The speaker 208 renders the acoustic signal through at least one speaker interface element. The speaker interface element is a part of the apparatus 200, and examples of the speaker interface element include, but not limited to, holes, apertures and any other type of outlets or mechanical design from which the acoustic signal can be radiated.

Additionally, or alternatively, an example of the speaker 208 is an audio display speaker, in which, a display along with other components, of the apparatus 200 is configured to generate the acoustic signal. The audio display speaker is capable of generating audio and tactile outputs. The audio display speaker is driven by a suitable transducer/actuator coupled to the display, and is capable of vibrating the display so that the display can generate acoustic waves along with the tactile outputs. In the example embodiment where the speaker 208 is the audio display speaker, the at least one speaker interface element is at least one of the display and a display window.

In an example embodiment, the microphone 210 is an acoustic-to-electric transducer or sensor which converts sound in air into a corresponding electrical audio signal. Such microphone 210 is made of electronics and electrical components, piezoelectric components, magnetic components and/or other materials. In another example embodiment, the microphone 210 is a microelectromechanical systems (MEMS) microphone and/or a MEMS accelerometer. It should be understood that there can be more than one microphone, such as the microphone 210 embodied in the apparatus 200, and multiple of such microphones can capture the acoustic signal.

In an example embodiment, some examples of the apparatus 200 include communication device, multimedia playback device, media capturing device with or without communication capabilities, computing devices, and the like. For examples, the apparatus 200 includes a mobile phone, audio/video player, a personal digital assistant (PDA), and the like. Some examples of computing device include a laptop, a personal computer, and the like. In an example embodiment, the apparatus 200 may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of the media content include audio content, video content, data, and a combination thereof.

These components (202-210) may communicate to each other via a printed circuit board (212) to facilitate control of applications in the apparatus 200. In an example embodiment, the PCB 212 is directly or indirectly connected to the components (202-210). In some example embodiments, the PCB 212 includes a flexi-board (or flexible terminal) or a secondary PCB that can be connected to a main PCB. In certain embodiments, the PCB 212 can be a central printed circuit board (PCB) such as a motherboard, main board, system board, or logic board.

In an example embodiment, the apparatus 200 is caused to perform controlling of an application being executed in the apparatus 200. Herein, the term 'application' includes any application involving one or a combination of audio, video, text, graphics, animation and images, that can be executed in the apparatus 200. Examples of the some of the applications may include, but are not limited to, audio/video playback, gaming applications, messaging applications, voice/video calls, email applications, notifications, calendar, alarm and web browsing. Various example embodiments of controlling the application in the apparatus 200 are hereinafter described.

In an example embodiment of controlling the application in the apparatus 200, the processor 202 is configured to, with the content of the memory 204, and optionally with other components described herein, to cause the apparatus 200 to capture an acoustic signal by the microphone 210 of the apparatus 200. The microphone 210 generates an electrical output signal in response of capturing the acoustic signal. The acoustic signal is rendered (or outputted) by the at least one speaker (for example, the speaker 208) through at least one speaker interface element of the apparatus 200, in response to a source audio signal. Herein, the acoustic signal includes sound waves as generated by the speaker 208 when the speaker 208 is driven with the source audio signal during an execution of audio playback application or other similar applications using the source audio signal. As described above, in the example embodiment of the speaker 208 being a typical electrical-to-acoustic speaker, examples of the at least one speaker interface element include one or more outlets or apertures that are in form of holes or other mechanical designs in the apparatus 200 that are used to output the acoustic signal (in form of sound waves). Also, in the example embodiment of the speaker 208 being the audio display speaker, examples of the at least one speaker interface element include at least one of the display window and the display, for example a touchscreen display of the apparatus 200, which is suitably designed as the audio display speaker, through which the acoustic signal is outputted. It is understood that in some example embodiments, the at least one speaker interface element may not include the one or more outlets (for example, the one or more holes or similar mechanical designs) through which the acoustic signals are radiated, when the audio display speaker is utilized. In further alternative embodiments, the audio display speaker is implemented in such a way that the one or more outlets function at least partially as sound generating outlets in addition to sound generating functionality of the audio display speaker. In such example embodiments, the sound waves are generated by the audio display speaker and also radiated at least partially through the one or more sound outlets.

During execution of the application, the speaker 208 converts the source audio signal (in form of an electrical signal) into the acoustic signal, and the acoustic signal is outputted through the speaker interface element. The acoustic signal when captured by the microphone 210 is converted into corresponding 'electrical output signal'. In an example embodiment, the source audio signal is stored in the apparatus 200, or is received from sources external to the apparatus 200. As such the apparatus 200 is caused to receive the source audio signal from external storage medium such as a digital video disc (DVD), compact disk (CD), flash drive, memory card, or from external storage locations through Internet, Bluetooth, and the like. In an example embodiment, the source audio signal is streamed/stored/pre-recorded by the processor 202 along with other components. In an example embodiment, the streaming/storing/pre-recording is performed prior to selection of the source audio signal or after selection of the source audio signal by the application.

In an example embodiment of controlling the application in the apparatus 200, the apparatus 200 is caused to compare the electrical output signal to the source audio signal in order to determine whether the electrical output signal is being affected by mechanical vibrations caused at least partially by the at least one speaker interface element (hereinafter referred to as 'speaker interface element') being at least partially interfered by a user or any other object. The mechanical vibrations are internal vibrations caused in the apparatus 200 during operation of the speaker 208, as sound waves also travel using mechanical construction of the apparatus 200 during operation of the speaker 208. The mechanical vibrations are increased in intensity or signal strength when the speaker interface element is interfered by the user or any other object. In an example embodiment, the electrical output signal is determined to be affected by the mechanical vibrations if the speaker interface element is either partially or fully interfered by the user. In the embodiment in which the speaker interface element is the outlet coupled with the speaker 208, if the outlet is interfered, the mechanical vibrations are enhanced and the electrical output signal is affected by the enhanced mechanical vibrations. For instance, if the user uses his/her finger or any other object to cover/block the outlet, the electrical output signal is affected by the enhanced mechanical vibrations; and such effect of the mechanical vibrations on the electrical output signal is determined based on the comparison of the electrical output signal and corresponding source audio signal. Similarly, in the embodiment in which the speaker 208 is the audio display speaker and the speaker interface element is the display, if the display is partially or completely interfered (for example, covered by hand), the mechanical vibrations are enhanced and the electrical output signal is affected by the enhanced mechanical vibrations, and such effect of the mechanical vibrations on the electrical output signal is determined based on the comparison of the electrical output signal and corresponding source audio signal.

In an example embodiment, for determining whether the electrical output signal is affected by the mechanical vibrations, the apparatus 200 is caused to determine a difference signal (for example, a difference of the electrical output signal and the source audio signal) based on comparing the electrical output signal and the source audio signal. In an example embodiment, if a signal level of the difference signal is higher than a threshold signal level, it is determined that the electrical output signal is affected by the mechanical vibrations caused by the speaker interface element being interfered by the user. Further, if the signal level of the difference signal is detected to be less than or equal to the threshold signal level, it is determined that the electrical output signal is not affected by the mechanical vibrations caused by the speaker interface element being interfered by the user. In an example embodiment, the threshold signal level is a predetermined level or can be set on-the-fly while using the apparatus 200. In an example embodiment, the threshold signal level is stored in the memory 204 or any other memory location accessible to the processor 202. In an example embodiment, the electrical output signal is compared to the source audio signal by comparing signal levels in one or more frequency bands of the electrical output signal to the signal levels in corresponding one or more frequency bands of the source audio signal. In an example embodiment, a processing means may be configured to compare the electrical output signal to the source audio signal in order to determine whether the electrical output signal is being affected by the mechanical vibrations caused at least partially by the speaker interface element coupled to the speaker 208 of the apparatus 200 being at least partially interfered by the user. An example of the processing means may include the processor 202, which may be an example of the controller 108.

As such, it should be understood that whether the electrical output signal is affected by the mechanical vibrations or not, is determined based on a ratio of the mechanical vibrations and the acoustic signal. For instance, a difference value between the electrical output signal and the source audio signal is proportional to the ratio of the mechanical vibrations and the acoustic signal. A larger difference between the electrical output signal and the source audio signal corresponds to a larger ratio of the mechanical vibrations and the acoustic signal, and hence it is inferred that the electrical output signal is affected by the mechanical vibrations caused at least partially by the speaker interface element at least partially interfered by the user. Similarly, a smaller difference between the electrical output signal and the source audio signal corresponds to a smaller ratio of the mechanical vibrations and the acoustic signal, and hence it is inferred that the electrical output signal is not affected by the mechanical vibrations and the speaker interface element is not interfered by the user.

In an example embodiment, the apparatus 200 is caused to perform a predetermined action in the apparatus 200 whenever it is determined that the electrical output signal is affected by the mechanical vibrations caused at least partially by the speaker interface element being at least partially interfered by the user. Herein, 'the predetermined action' includes any default action or one or more customizable actions provided as factory setting of the apparatus 200, as well as any action that can be defined by the user and/or by automatic or semiautomatic means, during any time of use of the apparatus 200. As such, it should be understood that the predetermined action includes any action that can be executed in the apparatus 200 or by the apparatus 200. For instance, if it is determined that the electrical output signal is affected by the mechanical vibrations due to interfering the speaker interface element by the user, an intended action from one or more predetermined actions is performed.

In some example embodiments, the apparatus 200 has multimedia capabilities encompassing audio, video, photos, and the like. In such example embodiments, some examples of the predetermined action include, but are not limited to, actions related to an audio playback, a audio/video playback, gaming applications, a mute function of an alarm, a vibrate function of the alarm, a snooze function of the alarm, and a termination function of the alarm. Herein, examples of the actions related to the audio playback, the audio/video playback include, but are not limited to, a mute function for the speaker 208, a pause function for the speaker 208, volume adjustment of the speaker 208, and a termination (or stop) function of a currently executed application. Additionally or alternatively, the apparatus 200 is, for example, a cellular phone or a multimedia device having communications capabilities in accordance with wired, wireless, or other communications networks configurations. In such example embodiments, examples of the predetermined action include, but are not limited to, a call receive function of an incoming call, a mute function of the incoming call, a call transfer function of the incoming call, a termination function of the incoming call, the call receive function in a speaker mode for the incoming call, and the termination function combined with a text message function of the incoming call, playback of a notification, mute/pause of an automatic reading of a message, email or webpage, with or without functions related to multimedia applications.

Some example embodiments of controlling an application in the apparatus 200 are explained in the following description with reference to FIGS. 3A-3C and 4A-4B, however, these example embodiments should not be considered as limiting to the scope of the present technology.

Figure 3A:
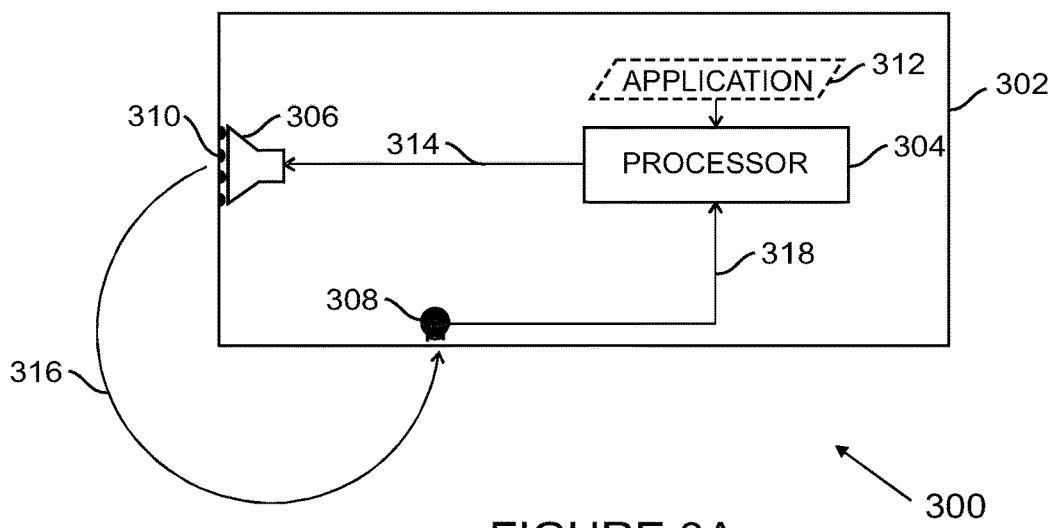
FIG. 3A illustrates an example representation of an apparatus with a non-interfered speaker interface element, in accordance with an example embodiment.
Figure 3B:
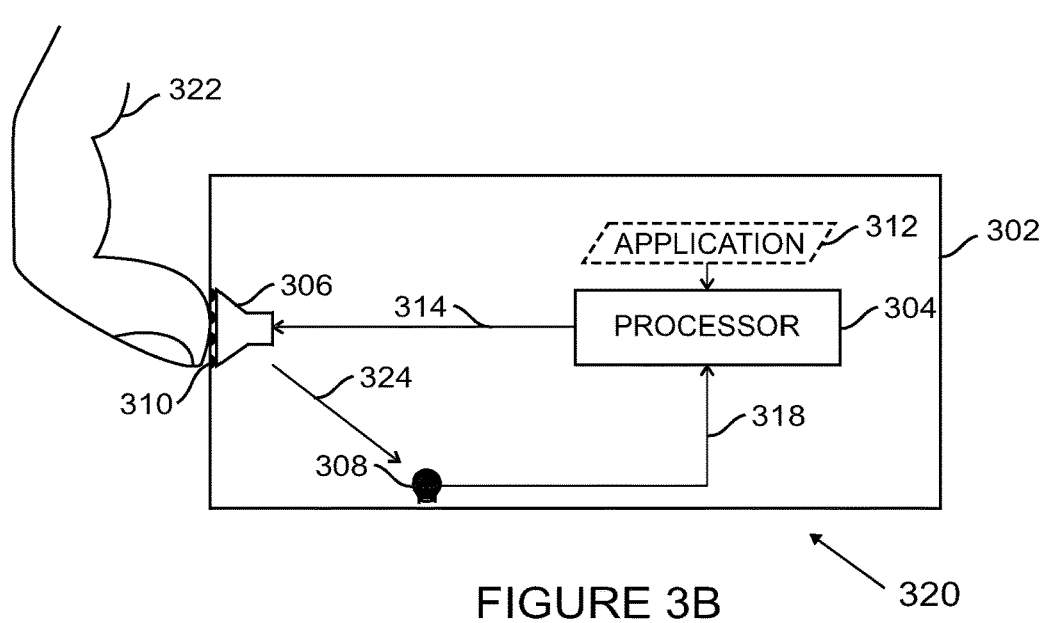
FIG. 3B illustrates an example representation of an apparatus with an interfered speaker interface element, in accordance with an example embodiment.

FIG. 3A illustrates an example representation 300 of an apparatus 302 where a speaker interface element is not being interfered by a user, and FIG. 3B illustrates an example representation 320 of the apparatus 302 where the speaker interface element is being interfered by the user, in accordance with an example embodiment. The apparatus 302 is an example of the apparatus 200. In the example representations 300 and 320, the apparatus 302 includes a processor 304, at least one speaker, for example a speaker 306, and at least one microphone, for example, a microphone 308. It should be noted that the apparatus 302 may include components other than those shown in the example representations 300 and 320, for example, there can more than one such microphone 308 in the apparatus 302.

In the example representation 300, the speaker interface element 310 includes holes that are positioned with respect to the speaker 306 such that the speaker 306 renders the acoustic signal through these holes. In the representation 300, the speaker interface element 310 is not interfered by the user or any other object. Upon initiation of an application 312, the processor 304 along with other components accesses content related to the execution of the application 312. In an example embodiment, the processor 304, based on the content related to the execution of the application, causes a corresponding source audio signal (in form of an electrical signal) to be fed to the speaker 306 (see, an arrow 314). Further, the acoustic signal is outputted by the speaker 306 through the speaker interface element 310 in response to the source audio signal. The acoustic signal is captured by the microphone 308 (see, an arrow 316) to generate an electrical output signal (see, an arrow 318). The processor 304 is configured to compare the electrical output signal and the source audio signal to determine a difference signal. The difference signal is used to determine whether the electrical output signal is being affected by mechanical vibrations caused at least partially by interfering the speaker interface element 310 by the user. For example, the processor 304 determines whether a signal level of the difference signal is greater than a threshold signal level or not. In this example representation 300, since the speaker interface element 310 is not interfered (for example, covered) by the user, the signal level of the difference signal is less than or equal to the threshold signal level. As the signal level of the difference signal is detected less than or equal to the threshold signal level, it is determined that the ratio of the mechanical vibrations to the acoustic signal is low and the electrical output signal is not affected by the mechanical vibrations. Hence, the apparatus 303 continues with performing the currently executed application, for example the playback of audio without any interruption.

In the example representation 320, the speaker interface element 310 is shown as being interfered (e.g., blocked) by a finger 322 of the user. For instance, the finger 322 of the user is positioned over the speaker interface element 310 such that the speaker interface element 310 is partially or completely blocked. Such blocking of the speaker interface element 310 causes a radiation of the acoustic signal (for example an audio) to be inhibited or reduced to zero, and the mechanical vibrations (see, 324) within the apparatus 302 are also enhanced due to such blockage of the speaker interface element 310. As the speaker interface element 310 is blocked, the electrical output signal (see, arrow 318) generated by the microphone 308 is determined to be affected by the mechanical vibrations. Such determination of occurrence of the speaker interface element 310 being interfered by the user, is done based on comparison of the electrical output signal (see, the arrow 318) and the source audio signal. For example, the processor 304 detects whether the signal level of the difference signal (difference of the electrical output signal and the source audio signal) is greater than the threshold signal level or not. In this scenario, as the speaker interface element 310 is interfered by the user, the signal level of the difference signal is determined to be greater than the threshold signal level, and it is further determined that the electrical output signal is affected by the mechanical vibrations caused by the interfering the speaker interface element 310 by the user. A predetermined action is thereby performed upon determination of the electrical output signal being affected by the mechanical vibrations caused by interfering the speaker interface element 310 by the user. For instance, a mute function of the speaker 306, a pause function of the speaker 306, or a termination function of the application 312 is performed.

Figure 3C:
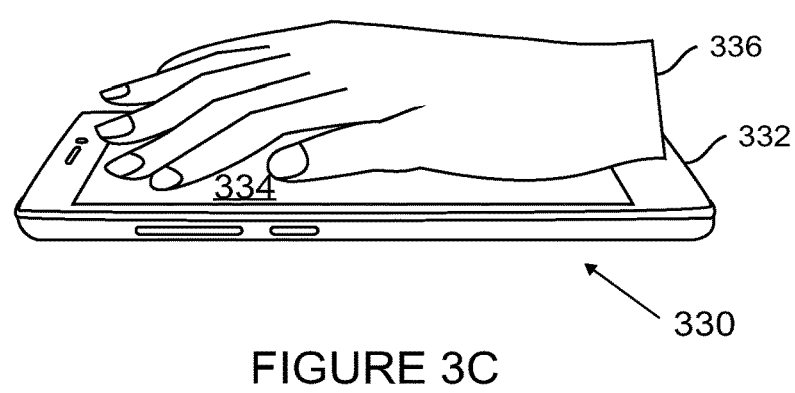
FIG. 3C illustrates an example representation of an apparatus with an interfered speaker interface element, in accordance with another example embodiment.

FIG. 3C illustrates an example representation 330 of an apparatus 332, in accordance with another example embodiment. The apparatus 332 is similar to the apparatus 302, however the speaker of the apparatus 332 is an audio display speaker (not shown in FIG. 3C) instead of the speaker 306 as present in the apparatus 302. It should be noted that the apparatus 332 includes components other than those shown in the example representation 330, for example the apparatus 332 includes a processor (similar to the processor 304) and at least one microphone (similar to the microphone 308). In an example embodiment, the apparatus 332 can also include the speaker 306 as well as the audio display speaker, and these speakers can be used to operate individually or jointly.

In the example representation 330, a speaker interface element 334 (for example, at least one of a display and a display window) is shown as interfered by a hand 336 of a user. For instance, the hand 336 of the user is positioned over the speaker interface element 334 such that the speaker interface element 334 is partially or completely touched. Due to the speaker interface element 334 being touched (an example of interfering the speaker interface element 334) by the user, the electrical output signal captured by the microphone is determined to be affected by mechanical vibrations. In an example embodiment, the processor is configured to determine the occurrence of the speaker interface element 334 being interfered by the user based on a difference signal of the electrical output signal and the source audio signal. In this representation, as the speaker interface element 334 is interfered with the hand 336 of the user, the signal level of the difference signal is detected as greater than the threshold signal level. Accordingly, a predetermined action is thereby performed upon determination of the electrical output signal being affected by the mechanical vibrations caused by the speaker interface element 334 interfered by the user.

Various example embodiments offer, among other several benefits, design flexibility in terms of positioning the speaker and the microphone in an apparatus such as the apparatus 200 or the apparatus 302, which are described with reference to FIGS. 4A and 4B.

Figure 4A:
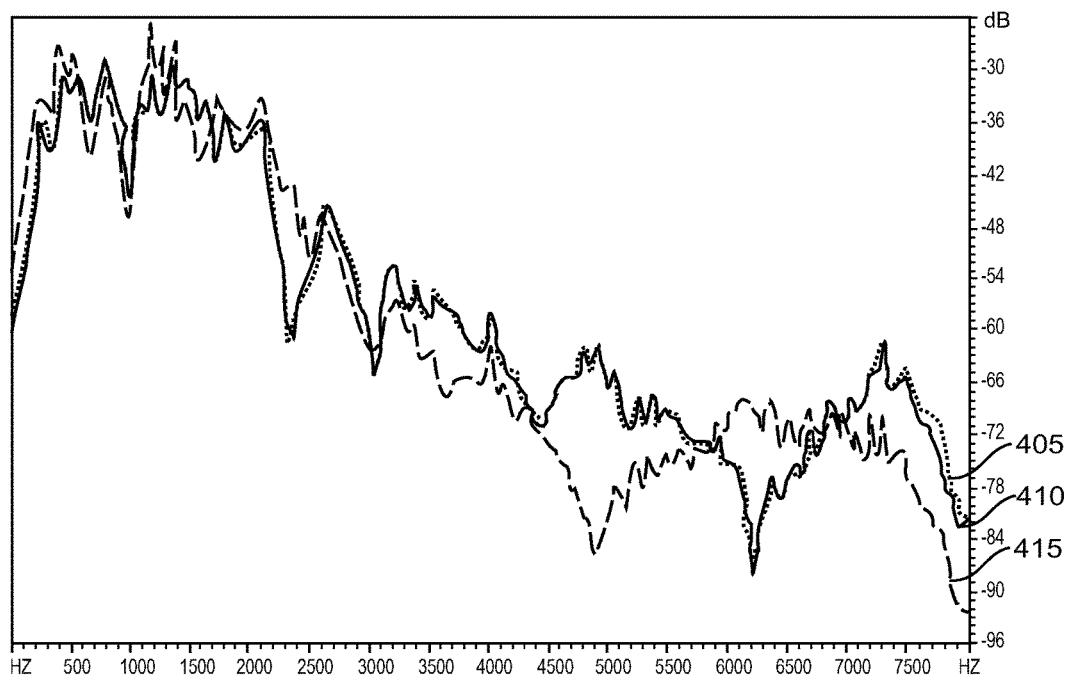
FIG. 4A is a graphical representation illustrating an example effect on an electrical output signal when a speaker and a microphone of an apparatus are closely located.
Figure 4B:
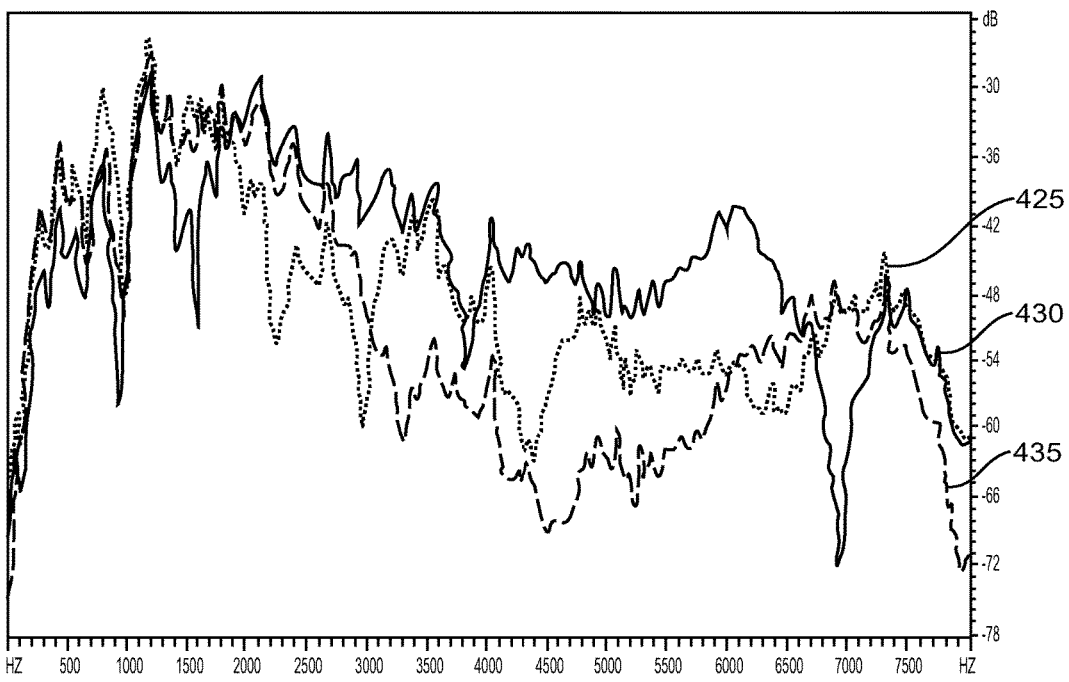
FIG. 4B is a graphical representation illustrating an example effect on an electrical output signal when the speaker and the microphone of the apparatus are spaced apart significantly.

FIG. 4A is a graphical representation 400 illustrating an example effect on an electrical output signal when a speaker and a microphone of an apparatus (for example, the apparatus 200 or 302) are located close to each other, and FIG. 4B is a graphical representation 420 illustrating an example effect on an electrical output signal when the speaker and the microphone of the apparatus are significantly spaced apart. It should be noted that the graphical representations 400 and 420 are shown for representation purposes only; and such representations are not provided to represent accuracy of the electrical output signals, but to facilitate description of some example embodiments only.

In the graphical representation 400, X-axis represents frequency in Hertz (Hz) and Y-axis represents average energy of the electrical output signal, in decibels (dB), which is generated based on capture of an acoustic signal by the microphone 210. The graphical representation 400 relates to a scenario where the speaker 306 and the microphone 308 of the apparatus 302 are positioned close to each other, for example at approximately 0.5 centimeter (cm). A spectrum 405 indicates energy level of the electrical output signal along frequency where the speaker interface element (for example, an outlet coupled to the speaker through which acoustic signal is outputted) is not interfered by the user. An example of the outlet is the speaker interface element 310 shown in FIGS. 3A and 3B. A spectrum 410 (not in accordance with example embodiments of the present disclosure) indicates energy level of the electrical output signal along frequency where an object such as user's finger 322 is placed close to the outlet, but does not interfere with (for example, cover) the outlet. For instance, the user's finger 322 is at a distance of approximately 1 cm close to the outlet for plotting the spectrum 410. A spectrum 415 is in accordance with example embodiments of the present disclosure, and indicates energy level of the electrical output signal along frequency where the outlet is interfered by an object such as user's finger 322. As illustrated in the representation 400, when the speaker 208 and the microphone 210 are located close to each other, the spectrums 405 and 410 are almost similar and a difference between the spectrums 405 and 410 may not be easily determined and is prone to errors. However, the spectrum 415 (i.e., in accordance with embodiments of present disclosure) is significantly different than the spectrum 405, and the difference can easily be determined by the processor 202.

In the graphical representation 420, X-axis represents frequency in Hertz (Hz) and Y-axis represents average energy of the electrical output signal, in decibels (dB), which is generated based on capture of the acoustic signal by the microphone 210. The graphical representation 420 relates to a scenario where the speaker 306 and the microphone 306 of the apparatus 302 are spaced apart significantly, for example at approximately 13 cm. A spectrum 425 indicates energy level of the electrical output signal along frequency where the outlet (the speaker interface element 310) of the apparatus 200 is not covered by the user. A spectrum 430 relates to an example scenario and is not in accordance with example embodiments of the present disclosure. The spectrum 430 indicates energy level of the electrical output signal along frequency, where an object such as the user's finger 322 is placed close to the outlet, but does not cover the outlet. For instance, the user's finder 322 (or hand) is at a distance of approximately 1 cm close to the outlet for plotting the spectrum 430. A spectrum 435 is in accordance with example embodiments of the present disclosure, and indicates energy level of the electrical output signal along frequency when the outlet is covered by the user's finger 322.

As illustrated in the representation 420, there is a noticeable difference in the spectrums 425 and 430 when the speaker 306 and the microphone 308 are spaced apart significantly, as opposed to a minimal difference between the spectrums 405 and 415 (see, the representation 400 of FIG. 4A) when the speaker 306 and the microphone 308 are not spaced apart significantly. Hence, for the existing example scenario that is not in accordance with example embodiments of the present disclosure, it is a design limitation to position a speaker and a microphone significantly spaced apart in an apparatus. However, embodiments of the present disclosure offer solutions that are capable of providing noticeable difference in energy of the electrical output signal when the outlet is covered and when the outlet is not covered by the user, irrespective of positions of the speaker 308 and the microphone 308 with respect to each other. For instance, there is significant difference between the spectrums 415 and 405, and also between the spectrums 435 and 425. Hence, various example embodiments of the present disclosure enable design flexibility and these example embodiments do not require additional hardware modifications as well.

In some scenarios, for example, if the apparatus (e.g., the apparatus 302 or the apparatus 322) is placed in a back pocket of clothing by the user, the speaker interface element (e.g., the outlet represented by the speaker interface element 310 or the display 334) can be unintentionally interfered. In an example embodiment, signal levels of the electrical output signal in frequency bands corresponding to such scenarios are predetermined and stored in the apparatus. Hence, when the speaker interface element is interfered unintentionally, the signal levels of the electrical output signal in corresponding frequency bands are compared against the stored signal levels and no predetermined action is performed, thereby making implementation of various example embodiments robust.

Figure 5:
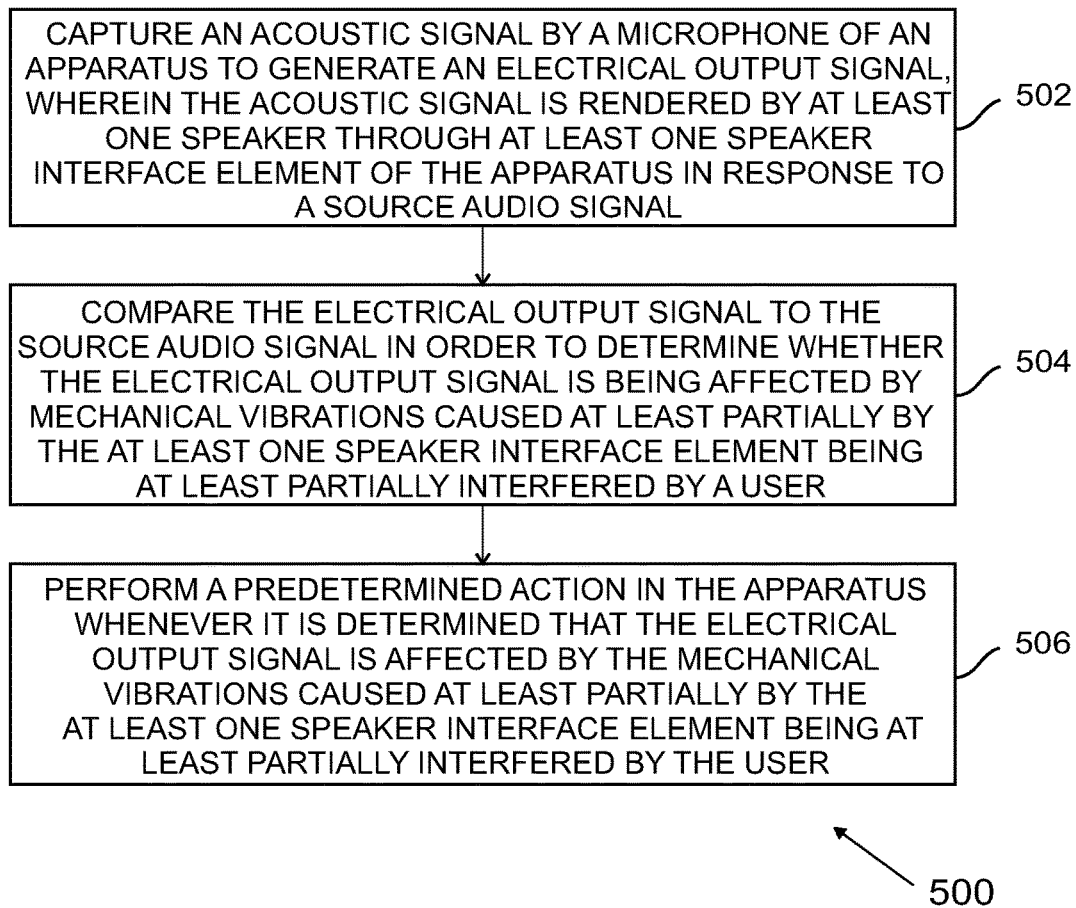
FIG. 5 is a flowchart depicting an example method for controlling an application, in accordance with an example embodiment.
Figure 6:
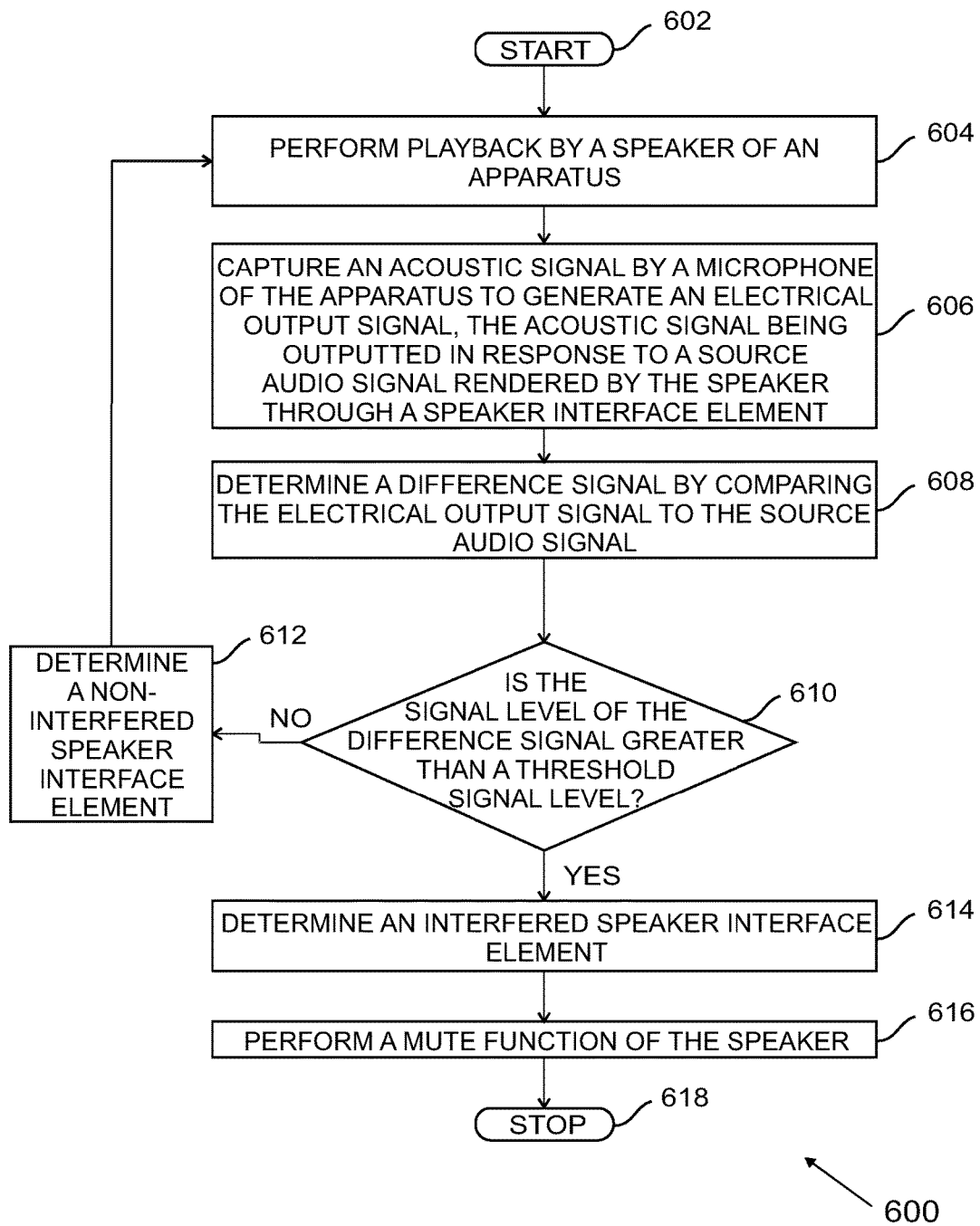
FIG. 6 is a flowchart depicting an example method for controlling an application, in accordance with another example embodiment.
Figure 7:
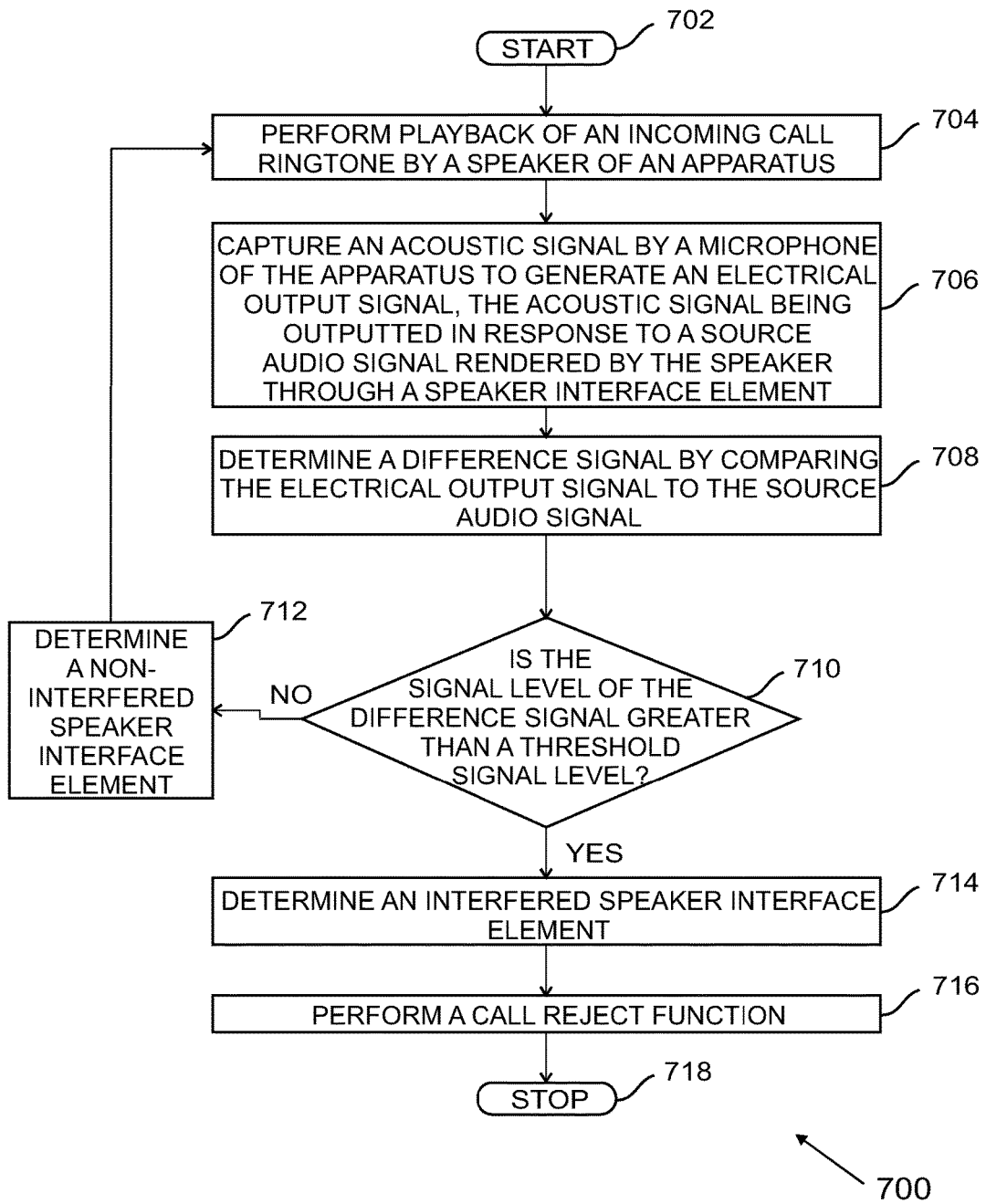
FIG. 7 is a flowchart depicting an example method for controlling an application, in accordance with another example embodiment.

Some example embodiments of methods of controlling an application in an apparatus are further described in reference with FIGS. 5 to 7.

FIG. 5 is a flowchart depicting an example method 500 for controlling an application in an apparatus, in accordance with an example embodiment. The method 500 is shown and explained with reference to FIG. 2 and also with reference to FIGS. 3A-3C. The method 500 depicted in the flowchart is executed by, for example, the apparatus 200 of FIG. 2, and/or the apparatuses 302 and 322 described with reference to FIGS. 3A-3C.

At 502, the method 500 includes capturing an acoustic signal by a microphone (e.g., the microphone 210) of an apparatus (e.g., the apparatus 200) to generate an electrical output signal. The acoustic signal is rendered by at least one speaker (e.g., the speaker 208) in response to a source audio signal through at least one speaker interface element. As described with reference to FIG. 2, examples of the at least one speaker are various known electrical-to-acoustic speakers, and also an audio display speaker. The examples of the at least one speaker interface element include holes, outlets or similar mechanical configurations through which the acoustic signal can be radiated. In the embodiment where the speaker is the audio display speaker, the at least one speaker interface element is at least one of the display and a display window. Herein, capturing the acoustic signal by the microphone 210 includes converting the acoustic signal into the electrical output signal.

At 504, the method 500 includes comparing the electrical output signal to the source audio signal in order to determine whether the electrical output signal is being affected by mechanical vibrations caused at least partially by the at least one speaker interface element (hereinafter referred to as 'speaker interface element') being at least partially interfered by a user. The source audio signal is stored in or is accessible by the apparatus. The source audio signal is compared with the electrical output signal by a processor, for example the processor 202, as described with reference to FIG. 2. In some example embodiments, the electrical output signal is compared to the source audio signal by comparing signal levels in one or more frequency bands of the electrical output signal to signal levels in corresponding one or more frequency bands of the source audio signal. The mechanical vibrations are internal vibrations caused in the apparatus during operation of the speaker. The mechanical vibrations are increased in intensity or signal strength when the speaker interface element is interfered by the user, as such interference enhances the sound pressure levels inside the apparatus 200. Accordingly, when the speaker interface element is either partially or fully interfered with by the user, there is a significant difference detected between the source audio signal and the electrical output signal, and based on the detection of the difference it is determined that the speaker interface element is interfered by the user. Some example embodiments of comparison of the electrical output signal and the source audio signal to determine whether the electrical output signal is being affected by the mechanical vibrations are described with reference to FIGS. 2, 3A, 3B and 3C. For instance, in an example embodiment, the electrical output signal is determined to be affected by the mechanical vibrations by determining a difference signal of the electrical output signal to the source audio signal, and detecting if a signal level of the difference signal is greater than a threshold signal level. In an example embodiment, the threshold signal level is a predetermined level or can be customized by the user.

At 506, the method 500 includes performing a predetermined action in the apparatus whenever it is determined that the electrical output signal is affected by the mechanical vibrations caused at least partially by the speaker interface element being at least partially interfered by the user. Examples of the predetermined action include any function or action defined by user, automatic means, semi-automatic means, or actions set in form of factory settings. Some examples of the predetermined action are described with reference to FIG. 2. For instance, various examples of predetermined actions include, but are not limited to, actions related to audio/video playback, a mute function of the speaker, a pause function of the speaker, a termination function of the application, a call receive function of an incoming call, a mute function of the incoming call, a call transfer function of the incoming call, a termination function of the incoming call, the call receive function in a speaker mode of the incoming call, the termination function combined with a text message function for the incoming call, a mute function of an alarm, a vibrate function of the alarm, a snooze function of the alarm, a termination function of the alarm, actions related to games, web browsing, and the like.

Some example embodiments of the control of an application in an apparatus are further explained with reference to FIGS. 6 and 7.

FIG. 6 is a flowchart depicting an example method for controlling an application in an apparatus, in accordance with another example embodiment. The method 600 is shown and explained with reference to FIG. 2. The method 600 depicted in the flowchart can be executed by, for example, the apparatus 200 of FIG. 2. The method 600 starts at block 602.

At 604, the method 600 includes performing playback (for example, a multimedia playback) by a speaker of the apparatus. The speaker is an example of the speaker 208 and the apparatus is an example of the apparatus 200. As such, upon receipt of a request for execution of an application for the playback, the speaker is activated, and the acoustic signal is rendered (outputted) through the speaker interface element of the apparatus. In an example embodiment, the acoustic signal is outputted in response to a source audio signal by the speaker through the speaker interface element.

At 606, the method 600 includes capturing the acoustic signal by a microphone (e.g., the microphone 210) of the apparatus to generate an electrical output signal. At 608, the method 600 includes determining a difference signal by comparing the electrical output signal to the source audio signal. In an example embodiment, the electrical output signal is compared to the source audio signal by comparing signal levels in one or more frequency bands of the electrical output signal to signal levels in corresponding one or more frequency bands of the source audio signal.

At 610, the method 600 includes comparing if a signal level of the difference signal is greater than a threshold signal level. In an example embodiment, the threshold signal level is a predetermined signal level stored in the apparatus. If the signal level of the difference signal is not greater than the threshold signal level, the method 600 goes to block 612 else operation at the block 614 is performed. At 612, the method 600 determines occurrence of a non-interfered speaker interface element, as it is determined that the electrical output signal is not affected by any mechanical vibrations caused by the speaker interface element being interfered by the user. Herein, 'non-interfered speaker interface element' refers to a scenario where the speaker interface element is not interfered by the user. As it is determined that the speaker interface element is not interfered by the user, the method 600 continues performing the playback.

At 610, if the signal level of the difference signal is more than the threshold signal level, it is determined that the electrical output signal is affected by the mechanical vibrations caused at least partially by the speaker interface element being interfered by the user. Accordingly, at 614, the method 600 determines occurrence of an interfered speaker interface element.

Further, at 616, the method 600 includes performing a mute function (an example of the predetermined action) of the speaker. Accordingly, the acoustic signal rendered by the speaker is stopped. The method 600 stops at 618. In an alternate embodiment, the mute function is performed as long as the user continues interfering the speaker interface element. In another alternate embodiment, the mute function is performed for a predefined duration of time, where the predefined duration of time depends upon the implementation. It should be noted that other variations can also be implemented for performing the predetermined actions upon determination of the speaker interface element being interfered by the user.

Another example embodiment of controlling an application in an apparatus is described with reference to FIG. 7.

FIG. 7 is a flowchart depicting an example method for controlling an application in an apparatus, in accordance with another example embodiment. The method 700 is shown and explained with reference to FIG. 2. The method 700 depicted in the flowchart can be executed by, for example, the apparatus 200 of FIG. 2. The method 700 starts at block 702.

At 704, the method 700 includes performing a playback by of an incoming call ringtone by a speaker of the apparatus. The speaker is an example of the speaker 208 and the apparatus is an example of the apparatus 200. As such, upon receipt of the incoming call, the speaker is activated by the processor of the apparatus for playback of the incoming call ringtone. The incoming call ringtone is stored in form of a source audio signal that is fed to the speaker for the playback and an acoustic signal is outputted in response to the source audio signal through the speaker interface element.

At 706, the method 700 includes capturing the acoustic signal by a microphone (e.g., the microphone 210) of the apparatus to generate an electrical output signal. At 708, the method 700 includes determining a difference signal by comparing the electrical output signal to the source audio signal. In an example embodiment, the electrical output signal is compared to the source audio signal by comparing signal levels in one or more frequency bands of the electrical output signal to signal levels in corresponding one or more frequency bands of the source audio signal, to thereby determine the difference signal.

At 710, the method 700 includes comparing if a signal level of the difference signal is greater than a threshold signal level. In an example embodiment, the threshold signal level is a predetermined signal level stored in the apparatus. If the signal level of the difference signal is not greater than the threshold signal level, the method 700 goes to block 712 else operation at the block 714 is performed. At 712, the method 700 determines occurrence of a non-interfered speaker interface element, as it is determined that the electrical output signal is not affected by any mechanical vibrations caused by the speaker interface element interfered by the user. As it is determined that the speaker interface element is not interfered by the user, the method 700 continues performing the playback of the incoming call ringtone.

At 714, the method 700 determines occurrence of an interfered speaker interface element. For example, as the difference signal is more than the threshold signal level, it is determined that the electrical output signal is affected by the mechanical vibrations caused at least partially by interfering the speaker interface element being at least partially interfered by the user. At 716, the method 700 includes performing a call reject function of the incoming call in the apparatus, and accordingly the incoming call is rejected. The method 700 stops at 718.

It should be understood that the methods 600 and 700 are provided with reference to two examples (mute function and call reject function) only, however various other types of predetermined actions are performed in the apparatus based on a continuous comparison of the source audio signal and the electrical output signal by the processor. For example, at any time instance, if it is determined that the electrical output signal is affected by the mechanical vibrations caused by interfering the speaker interface element by the user, the predetermined action is performed in the apparatus.

It should be noted that to facilitate discussions of the flowcharts of FIGS. 5, 6, and 7, certain operations are described herein as constituting distinct steps performed in a certain order. Such implementations are examples only and non-limiting in scope. Certain operation may be grouped together and performed in a single operation, and certain operations may be performed in an order that differs from the order employed in the examples set forth herein. Moreover, certain operations of the methods 500, 600, and 700 are performed in an automated fashion. These operations involve substantially no interaction with the user. Other operations of the methods 500, 600, and 700 may be performed by in a manual fashion or semi-automatic fashion. These operations involve interaction with the user via one or more user interface presentations.

The methods depicted in these flowcharts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods may be described and/or practiced by using any other apparatus.

Without in any way limiting the scope, interpretation, or application of the claims appearing below, a technical effect of one or more of the example embodiments disclosed herein is to improve control of applications in an apparatus. Various example embodiments provision for accurate and reliable methods of controlling the applications that are currently executed in the apparatus, thereby enabling desired predetermined actions to be performed. Various example embodiments provision for easy control of the multimedia applications as no extra hardware is required, and also offer design flexibility in terms of positioning of the speaker and microphone in the apparatus.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
capturing an audible acoustic signal from at least one microphone of an apparatus to generate an electrical output signal, during an application that causes the audible acoustic signal, wherein the audible acoustic signal is radiated from at least one speaker of the apparatus, wherein the at least one speaker is configured to radiate the audible acoustic signal from at least one speaker interface element of the apparatus in response to an electrical source audio signal provided from the apparatus driving the at least one speaker to cause one or more sound outlets of the at least one speaker interface element to radiate the audible acoustic signal from the apparatus when the at least one speaker is driven based on the electrical source audio signal while the application is running;
based on comparing the electrical output signal from the at least one microphone and the electrical source audio signal provided from the apparatus, determining a difference signal is affecting the electrical output signal based on mechanical vibrations resulting from the one or more sound outlets being at least in part interfered with by an object at least in part covering the one or more sound outlets of the at least one speaker interface element during radiating of the audible acoustic signal from the apparatus through the at least in part interfered one or more sound outlets;
based on determining the difference signal is affecting the electrical output signal, facilitating control of an operation using a predetermined action while the application is running; and
performing the predetermined action using the affected electrical output signal at the apparatus based on the difference signal affecting the electrical output signal based on the mechanical vibrations resulting at least in part from the object interfering with the one or more sound outlets of the at least one speaker interface element so that the operation can be controlled while the application is running.

2. The method as claimed in claim 1, wherein comparing the electrical output signal from the at least one microphone and the electrical source audio signal comprises comparing signal levels in one or more frequency bands of the electrical output signal to signal levels in corresponding one or more frequency bands of the electrical source audio signal.

3. The method as claimed in claim 1, wherein determining the difference signal is affecting the electrical output signal based on the mechanical vibrations comprises:
comparing the difference signal to a threshold value, wherein the electrical output signal is determined to be affected by the difference signal based on the difference signal being greater than the threshold value.

4. The method as claimed in claim 1, wherein performing the predetermined action by the apparatus further comprises executing at least one of a mute operation for the at least one speaker, a pause operation for the at least one speaker, a termination operation for a multimedia application and one or more playback operations for the multimedia application.

5. The method as claimed in claim 1, wherein performing the predetermined action by the apparatus further comprises executing at least one of a call receive operation for an incoming call, a mute operation for the incoming call, a call transfer operation for the incoming call, a termination operation for the incoming call, the call receive operation for a speaker mode of the incoming call, and the termination operation combined with a text message operation for the incoming call.

6. The method as claimed in claim 1, wherein performing the predetermined action by the apparatus further comprises executing at least one of a mute operation for an alarm, a vibrate operation for the alarm and a snooze operation for the alarm and the action is performed as long as the one or more sound outlets being at least in part interfered by the object.

7. The method as claimed in claim 1, further comprising:
comparing frequency bands of the electrical output signal to predetermined frequency bands of the electrical output signal stored in the apparatus corresponding to at least one scenario in which the one or more sound outlets are unintentionally interfered; and wherein the predetermined action is allowed in the apparatus whenever it is determined that the one or more sound outlets are not unintentionally interfered.

8. The method as claimed in claim 1, wherein the at least one speaker is spaced apart from the at least one microphone to provide a difference in energy between one or more of a first spectrum of the electrical output signal when the one or more sound outlets are at least in part interfered or a second spectrum when the one or more sound outlets are at least in part interfered by the object.

9. The method as claimed in claim 1, wherein performing the predetermined action further comprises:
performing the predetermined action for one of a predetermined time and a duration of an interference with the one or more sound outlets.

10. The method as claimed in claim 1, wherein a difference in energy of the electrical output signal when the one or more sound outlets are at least in part interfered and the electrical output signal when the one or more sound outlets are not interfered by the object is detectable irrespective of at least one of a position of the at least one speaker and a position of the at least one microphone.

11. An apparatus comprising:
at least one processor; and
at least one memory comprising computer program code, the at least one memory and the computer program code configured to, with the at least one processor, cause the apparatus to at least perform:
capture an audible acoustic signal from at least one microphone of the apparatus to generate an electrical output signal, during an application that causes the audible acoustic signal, wherein the audible acoustic signal is radiated by at least one speaker of the apparatus, wherein the at least one speaker is configured to radiate the audible acoustic signal from at least one speaker interface element of the apparatus in response to an electrical source audio signal provided from the apparatus driving the at least one speaker to cause one or more sound outlets of the at least one speaker interface element comprises to radiate the audible acoustic signal from the apparatus;
compare the electrical output signal from the at least one microphone and the electrical source audio signal provided in the apparatus to determine a difference signal is affecting the electrical output signal based on mechanical vibrations resulting from the one or more sound outlets being at least in part interfered with an object at least in part covering the one or more sound outlets of the at least one speaker interface element during radiating of the audible acoustic signal from the apparatus through the at least in part interfered one or more sound outlets to facilitate control of an operation by a predetermined action while the application is running; and perform the predetermined action by the apparatus using the affected electrical output signal based on the difference signal cause affecting the electrical output signal based on the mechanical vibrations resulting at least in part from the object interfering with the one or more sound outlets of the at least one speaker interface element so that the operation can be controlled while the application is running.

12. The apparatus as claimed in claim 11, wherein for comparing the electrical output signal from the at least one microphone and the electrical source audio signal, comprises comparing signal levels in one or more frequency bands of the electrical output signal to signal levels in corresponding one or more frequency bands of the electrical source audio signal.

13. The apparatus as claimed in claim 11, wherein determining that the difference signal is affecting the electrical output signal based on the mechanical vibrations,
comprises comparing the difference signal to a threshold value, wherein the electrical output signal is determined to be affected by the difference signal if the difference signal is greater than the threshold value.

14. The apparatus as claimed in claim 11, wherein the at least one microphone comprises a microelectromechanical systems microphone.

15. The apparatus as claimed in claim 11, wherein the at least one speaker comprises an audio display speaker.

16. The apparatus as claimed in claim 11, wherein the at least one speaker interface element comprises at least one of a display window and a display.

17. The apparatus as claimed in claim 11, wherein the predetermined action performed by the apparatus comprises at least one of a mute operation of the at least one speaker, a pause operation for the at least one speaker, a termination operation for a multimedia application and one or more playback operations for the multimedia application.

18. The apparatus as claimed in claim 11, wherein the predetermined action performed by the apparatus comprises a call receive operation for an incoming call, a mute operation for the incoming call, a call transfer operation of the incoming call, a termination operation for the incoming call, the call receive operation for a speaker mode of the incoming call, and the termination operation combined with a text message operation for the incoming call.

19. The apparatus as claimed in claim 11, further comprising:
a user interface and user interface software configured to facilitate a user to control at least one operation for the apparatus through use of a display and further configured to respond to user inputs, wherein the display is configured to display at least a portion of the user interface and the display is configured to facilitate the user to control at least one operation for the apparatus.

* * * * *